(12) United States Patent
Joukov et al.

(10) Patent No.: US 8,949,812 B2
(45) Date of Patent: Feb. 3, 2015

(54) SYSTEM AND METHOD FOR UPDATING HARD-CODED DEPENDENCIES

(75) Inventors: Nikolai A. Joukov, Thornwood, NY (US); Joel P. Ossher, Irvine, CA (US); Birgit M. Pfitzmann, Valhalla, NY (US); Vasily Tarasov, Stony Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 774 days.

(21) Appl. No.: 12/871,468

(22) Filed: Aug. 30, 2010

(65) Prior Publication Data

US 2012/0054727 A1    Mar. 1, 2012

(51) Int. Cl.
G06F 9/44        (2006.01)
G06F 9/445       (2006.01)

(52) U.S. Cl.
CPC ................................. G06F 9/44505 (2013.01)
USPC ....................................................... 717/168

(58) Field of Classification Search
USPC ............. 717/168; 705/16, 21, 59, 71; 380/44, 380/262, 278, 279
See application file for complete search history.

(56) References Cited

U.S. PATENT DOCUMENTS

| 6,711,739 | B1* | 3/2004 | Kutcher ............................ 718/1 |
| 2004/0143828 | A1* | 7/2004 | Liu et al. ....................... 717/168 |
| 2005/0187983 | A1* | 8/2005 | Narang et al. ................ 707/200 |
| 2008/0306958 | A1* | 12/2008 | Sreedhar ........................... 707/9 |
| 2010/0095287 | A1* | 4/2010 | Chipman ....................... 717/157 |
| 2010/0287355 | A1* | 11/2010 | Nair et al. ..................... 711/207 |
| 2010/0313256 | A1* | 12/2010 | Sekiguchi et al. ................ 726/7 |

OTHER PUBLICATIONS

Geay, E., et al. "Modular String-Sensitive Permission Analysis With Demand-Driven Precision" 31st International Conference on Software Engineering, ICSE 2009. May 2009 pp. 1-11.

Joukov, N., et al. "Built-To-Order Service Engineering for Enterprise It Discovery" 2008 IEEE International Conference on Services Computing (SCC 2008). Jul. 2008 pp. 1-8.

Magoutis, K., et al. "Galapagos: Model-Driven Discovery of End-To-End Application-Storage Relationships in Distributed Systems" IBM Journal of Research and Development. vol. 52, No. 4/5. Jul./Sep. 2008. pp. 367-377.

\* cited by examiner

*Primary Examiner* — Dante Ravetti
(74) *Attorney, Agent, or Firm* — Tutunjian & Bitetto, P.C.; Louis J. Percello

(57) ABSTRACT

A system and method includes discovering one or more instances of external resource access by statically analyzing application code. One or more locations of constants are identified in the application code and a configuration repository that specify addresses of discovered instances of external resource access. The application code and the configuration repository are updated to change values of the constants to enable migration.

25 Claims, 6 Drawing Sheets

SYSTEM AND METHOD FOR UPDATING HARD-CODED DEPENDENCIES

BACKGROUND

1. Technical Field

The present invention relates to information systems and more particularly to systems and methods for automatically updating hard-coded dependencies.

2. Description of the Related Art

Many enterprises perform data-center transformations, consolidations, and migrations to reduce costs and make information technology (IT) greener. Dependencies between components are a key factor in the planning, and most projects later involve address changes. Discovering dependencies and reconfiguring the components using changed addresses is a significant challenge, in general, and even more so when the names and addresses are embedded in code instead of configuration files.

Today enterprise IT environments undergo significant transformations that include server virtualization, server migrations to clouds, and server migrations between data centers. In all these cases, servers typically change their Internet Protocols (IP) and/or destination node Domain Name System (DNS) names. Unfortunately, many if not most applications have server names or IP addresses embedded in their code. This is also true for Java Enterprise Edition™ or Java EE™ (J2EE) applications running in Application Servers.

Such applications are supposed to have dependencies on other servers or software components externalized in special configuration files that are easy to update. However, this is not the case for a vast majority of real-world applications. These dependencies may be referred to as hard-coded dependencies. Application migration teams have to manually update hard-coded dependencies for each application, which can take a person-year per application. If this same application has to be moved again later, the work has to be repeated.

SUMMARY

A system and method includes discovering one or more instances of external resource access by statically analyzing application code. One or more locations of constants are identified in the application code and a configuration repository that specify addresses of discovered instances of external resource access. The application code and the configuration repository are updated to change values of the constants to enable migration.

A system includes a processor, and a memory coupled to the processor. The memory is configured to execute a tool for changing hard-coded dependencies in application code. The tool is configured to discover one or more instances of external resource access by statically analyzing application code; identify one or more locations of constants in the application code and a configuration repository that specify addresses of discovered instances of external resource access; and update the application code and the configuration repository to change values of the constants to enable migration.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
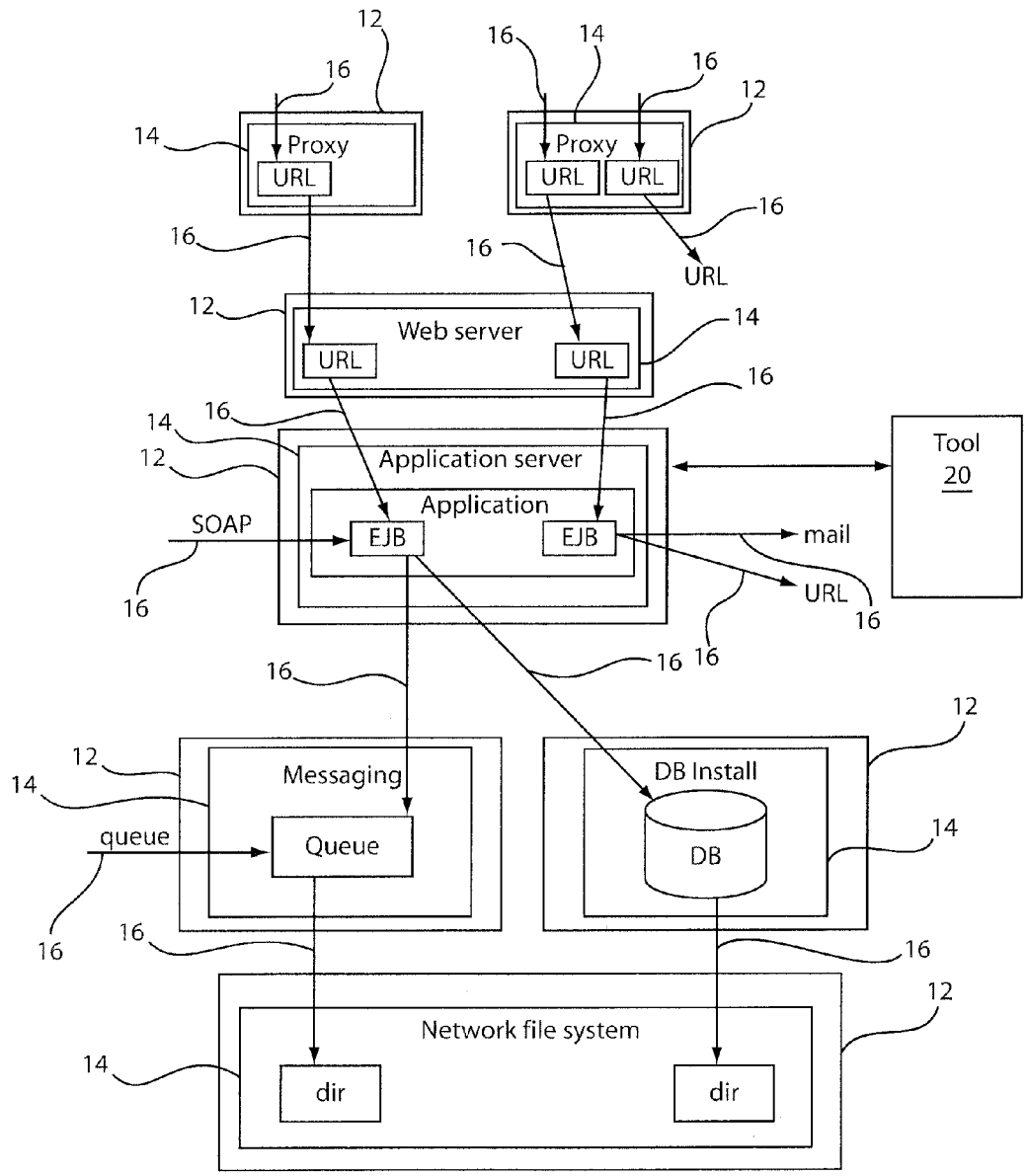
FIG. 1 is a block diagram illustratively showing dependencies between software components to be updated by a tool in accordance with the present embodiments.

In accordance with the present principles, systems and methods are provided that automatically find external dependencies in application code, e.g., Java™ code and, if desired, automatically relink them, i.e., make address changes, even in complex cases where addresses are computed in the code from combinations of hard-coded parts and external properties files.

In accordance with particularly useful embodiments, String Analysis is employed to model string transformations inside of applications to locate hard-coded dependencies in class files (e.g., Java™ class files). The location of hard-coded strings or other constants used to construct addresses of external resources in Java™ class files are tracked and the constants either replaced by corresponding constants that will yield the new addresses after migration, or replaced with either J2EE™-compliant functions (in case of J2EE™ applications) or functions to load strings from properties files, configuration databases, or the like.

These J2EE™-compliant configuration files, properties files or the like are generated with the previously hard-coded constant or string parameters or with their new value so that the address after migration is contained. The present principles may also be used without any current migration, or for addresses of external resources that do not change in the current migration, to make possible future changes easier. In this way, the programs become J2EE™-compliant or easily configurable via properties files for stand-alone applications. The changed application code may be applied to the servers where the original application code was running. In addition, a patch or a patch fragment may be generated for the source code so that newly built applications would include same updates, and the patch may be applied to the source code.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Large-scale IT transformation projects, such as, server consolidation, cloud migration, data center relocation, application consolidation, application migration, recovery planning, storage redesign, and the like generally follow a same sequence. We summarize such tasks as "migration" in the following. Beginning with a discovery phase, the configuration of the originating system is explored and documented. This is followed by a planning phase, where the target configuration is specified, and a plan is developed for performing the migration. Next, the actual migration occurs, where server images, applications, databases, etc. are moved or modified. Finally, the resulting system is tested.

Dependencies between applications are a major source of complexity in the migration process. They are needed in planning, as one needs to know which components influence the others and how components can be grouped together for migration (which may occur over the course of a few months). Dependencies are also needed during the migration itself, as component names or addresses often change, and so need to be updated in all of the appropriate locations, in a process called relinking.

Referring now to the drawings in which like numerals represent the same or similar elements and initially to FIG. 1, an illustrative dependency structure for a candidate system for IT transformation is shown. An arrow from Component A to Component B means that A depends on B. Dependencies indicated by the arrows may not be known and therefore dependency discovery is needed.

Servers 12 include applications or software components 14 such as, proxy servers, web servers, application servers, messaging programs, database programs, network file systems, etc. The software components include URLs, directories, resource files, Enterprise JavaBeans (EJB), etc. These applications and components include dependencies 16, which may include hard-coded dependencies.

There are two discovery methods that may work by either monitoring the running system or statically exploring configuration files. When used in conjunction with one another, discovery tools can give a fairly complete picture of a deployed system. However, every configuration-based approach is dependant on the configuration files accurately capturing the dependencies in the system. Monitoring-based approaches do not have this limitation, but they are ill-suited for discovering rare behavior, and provide little information to aid with relinking.

Configuration files should accurately represent the system configuration, and in some cases completely represent the system. For example, according to the Java Enterprise Edition™ (Java EE™) specification, all references to other software components, servers, and network or storage resources should be placed in standardized configuration files. Java EE™ programs are important in migration scenarios. However, we discovered many instances where dependencies were either specified in non-standard resource files or wholly or partially specified in the code itself. These dependencies pose a major problem to existing discovery systems, and they cannot be captured by configuration-based approaches. Monitoring-based approaches face the issues described above.

If dependencies are not discovered and relinked, then during the end-user acceptance tests or even after cut-over, issues may still arise which lead to time-consuming root-cause analysis and possible delays in the project schedule. Any method to identify and relink these dependencies in the earlier transformation phases has huge potential cost savings.

In accordance with the present principles, a tool 20 for the automated detection and relinking of dependencies in standard applications, such as Java™ and Java EE™ is provided. The tool 20 is designed to detect dependencies 16 that are specified in the code itself, so it looks for instances where the application accesses a database, a file system, network resources, or the like. For each access, the tool 20 attempts to determine the target, which is either indirectly specified through external resource files or directly specified through expressions based on constants, often string constants, or a combination of both.

The tool 20 works on code and in particular, Java™ bytecode, and understands standard packaging formats, such as jar, web archive (WAR), enterprise archive (EAR) files, etc. Given an application, the tool 20 first identifies library calls that access the file system or create network connections or the like. The parameters to these calls are then traced back to determine (a) what is being accessed and (b) where the reference is stored. If the reference is in a resource file, its location and the property accessed are reported. If the reference is improperly hard-coded, the tool 20 can modify the bytecode to either alter the reference or externalize the bytecode to a resource file. The analysis is preferably static, and may be built on top of the open source WALA infrastructure, a research system WALA-SA for string analysis, and a research and services asset Galapagos™ with improvements for fetching code and related files and configurations.

The tool 20 aids the discovery phase of transformation projects, augmenting static configuration discovery with information previously unavailable. The tool 20 also simplifies the migration phase, as the tool 20 allows the migration engineer to more easily locate and change the non-standard configuration information or even does so fully automatically. The tool 20 automatically detects dependencies in bytecode, modifies application bytecode to externalize hard-coded constants, and evaluates the prevalence of hard-coded dependencies in production (e.g., Java™ EE) code.

Figure 2:
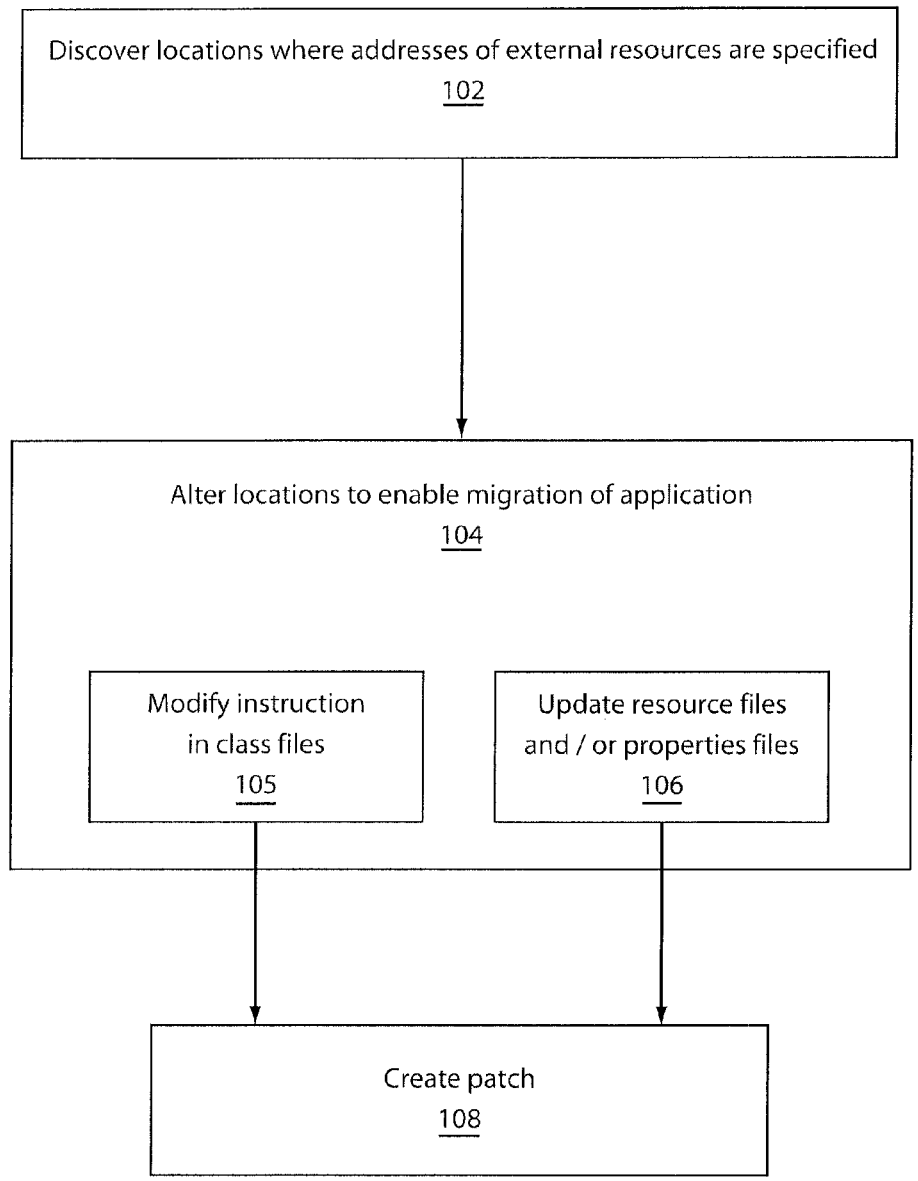
FIG. 2 is a block/flow diagram showing a system/method for updating hardcoded dependencies in accordance with one illustrative embodiment.

Referring to FIG. 2, a system/method for making hard-coded dependencies platform compliant or configurable is illustratively shown. In block 102, locations in code are discovered where addresses of external resources are specified. A location of hard-coded strings may be tracked by emulating the operation of application functions performing string transformations. A string analysis package (e.g., a modified Java String Analyzer (JSA) or WALA-SA) may be employed to emulate the operations. The string analysis preferably has a labeling feature that permits the derivation of an origin of the hard-coded string even if it was assigned to a variable several function-calls away from the use of the variable to connect to an external resource.

In block 104, the addresses of external resources are altered in the discovered locations, to enable migrations, i.e., either the old locations will now contain a new address of a migrated external resource, or the address will be externalized to a resource or properties file and the code will be altered to read it from there. Options (block 105 and 106) are provided to a user in making the hard-coded dependencies specification compliant and/or configurable for future migration. The options may also be chosen once and for all so that the tool will then run fully automatically. In block 105, instructions in class files (e.g., Java™ class files) are modified from loading a constant (constant string) to loading a string value from a resource file (e.g., if a J2EE™ application is being used) or a properties file (if the application is stand-alone).

In block 106, resource files on the application server are updated to have a new resource element, or a new resource file is created with the new resource element. In block 108, a source code patch or a patch sketch is/are created so that the original sources (e.g., Java sources) can be updated, if available. In this way, future versions of the same program will be easy to update without changing the code again. Recall that the primary tool worked on deployed byte code, hence also changing source code is an optional step. In this way, the hard-coded strings of a program or software component can be made compliant to a present environment or any future environment with minimal manual effort.

Figure 3:
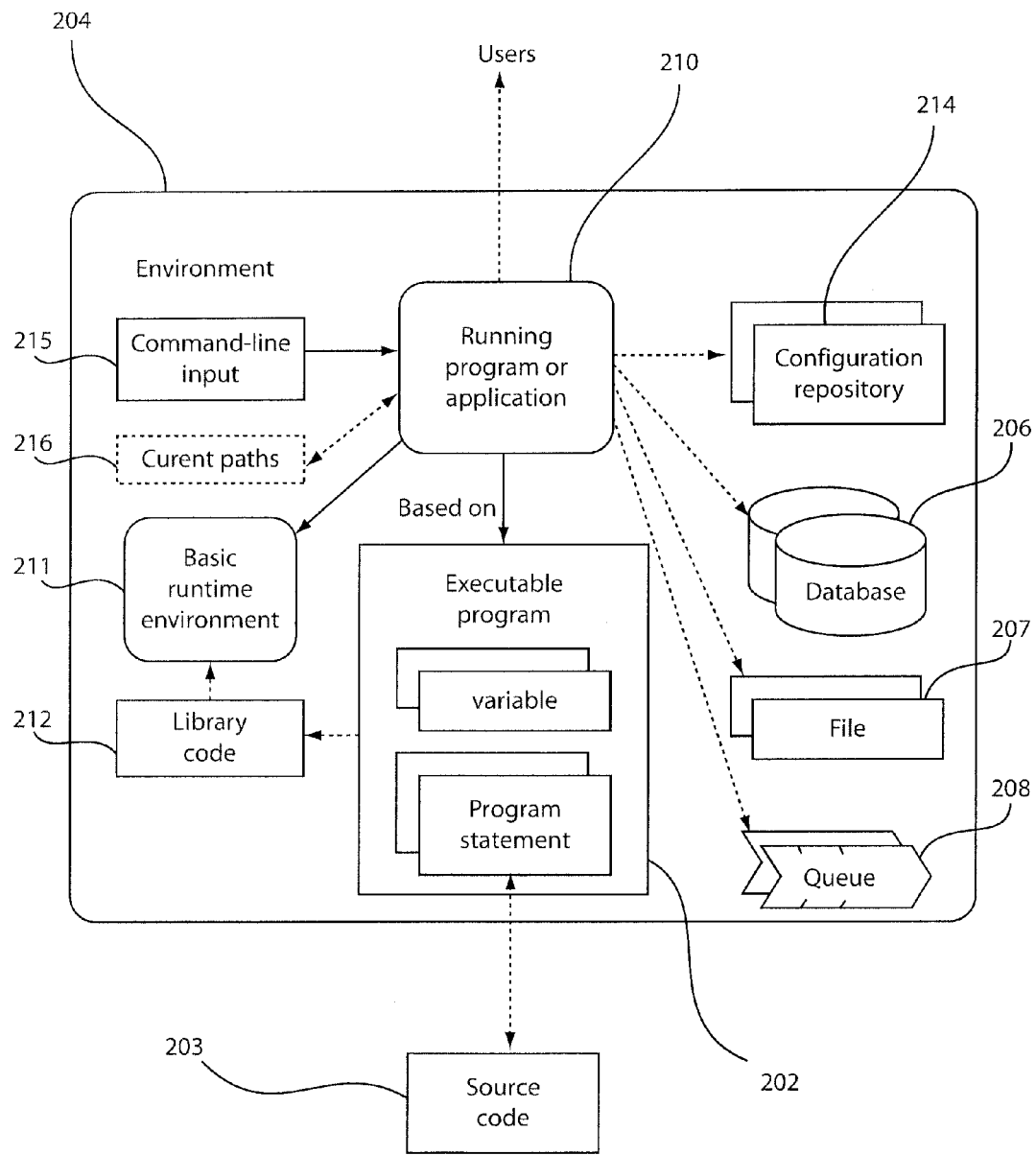
FIG. 3 is a block/flow diagram showing a computer program and its running environment in accordance with the present principles.

Referring to FIG. 3, an enterprise production setting is described to show an example of increasingly complex code dependencies on external resources to describe the tool 20 in this context. A program 202 is shown in an enterprise production environment 204. Program 202 has its source code 203. Relevant external resources, e.g., database 206, file 207 and queue 208 are shown. We are primarily interested in those that reside on a different server, but in several situations, such as end-to-end tracking and application-level transformation, resources on the same server are also of interest. From a point of view of our analysis, "external" means everything outside the program 202 and its runtime instance 210.

The program 202 has a basic run-time environment 211, such as a Java EE™ application server, and may depend on other code libraries 212. A configuration repository 214 represents any configuration files or configuration databases that the program may have. While command-line inputs and configurations 215 can be changed, when dealing with long-running applications, they are effectively static. Even if an enterprise program does not run continuously, it is usually restarted every time by a fixed script, and thus with the same configuration.

Examples of Code-based Dependencies: There are two approaches used to specify code-based dependencies. They can either be hard-coded as constants or loaded from external resource files. Table 1 shows two examples of the hard-coded as constants approach. In both cases, the program in Table 1 attempts to access a file by opening a FileInputStream with a path that is directly specified in the code. For f0, the path to the file is given as a single constant string. This type of hard-coded dependency is easy to detect and fix, but it is not very common. More commonly, the path is constructed by multiple statements. For f1, the path is obtained by concatenating a constant string and the value of variable name. This value depends on another variable, version. Without a string analysis, we would be forced to overapproximate the path as /data/*. String analysis, however, properly computes the two possible paths as /data/matrix.old and /data/matrix).

Table 2 shows an example of an indirectly specified dependency, where the resource's path is itself stored in an external resource file. In a real application, all four statements would not necessarily appear together. In this example, DriverManager.getConnection attempts to open a database connection. Its first parameter is the database's URL, which is the concatenation of two strings. As the value of db is not specified in the code, existing string analysis techniques would approximate the URL as jdbc:db2://*. This does not provide sufficient information to identify the database.

Our extension of the string analysis allows us to go further. The string analysis detects that the variable db is assigned a value originating from a properties file, as seen in the expression props.getProperty("db.dbname"). Once this resource access is identified, our analysis performs two additional steps. First, it determines the property name, in this case "db.dbname", by redoing the analysis on the new parameter. Second, it performs a variation on the string analysis to trace back the file from which props was loaded. With both of these pieces of information, we can then load the properties file ourselves, as in Table 3, and determine that the value of db is sales.

In the example of Table 2, the properties file was loaded using getResourceAsStream("settings.properties") rather than from a specific path. Such resource accesses take advantage of Java's classloader to locate the specific files, and so is better suited for portable programs. To locate "settings.properties", we must mimic Java's classloader behavior based on the run-time environment for the application.

TABLE 1

Two examples of hard-coded file dependencies

```
FileInputStream f0, f1;
f0 = new FileInputStream("/data/matrix");
if (version == "old")
    name = "matrix.old";
else
    name = "matrix";
f1 = new FileInputStream("/data/" + name);
```

Completeness and Correctness Goals: Discovering precisely what resources a program accesses is undecidable, and consequently, no static analysis technique can be fully successful. While the present approach may miss some dependencies, sometimes the resource path will be approximated by a wildcard. Sometimes the resource access will not be detected at all (as in the case of reflection). However, while completeness would certainly be ideal, it is not necessary. As was discussed previously, the tool 20 helps with discovery and relinking in server migrations. None of the current tools in this domain are complete, and each contributes something unique. Any dependency we can automatically handle is one less that has to be found manually.

TABLE 2

Dependency on a database via properties

```
Properties props = new Properties( );
props.load(getClass( ).getResourceAsStream(
    "settings.properties"));
String db = props.getProperty("db.dbname");
Connection cn = DriverManager.getConnection(
    "jdbc:db2://" + db, "admin", "pwd");
```

TABLE 3

Java property file settings.properties

```
# DATABASE configuration
db.dbname=sales
db.maxcon=5
db.mincon=2
```

With regards to correctness, one goal is for the tool 20 not to miss any possible resource paths for accesses that the tool 20 detects. For example, if the tool 20 discovers an instantiation of FileInputStream, the tool 20 should accurately list all of the potential paths 216 to the file being opened. Wildcards are acceptable; but not the case where the tool claims that the path is "/data/foo" while it could also be /data/bar". This form of correctness is needed so as to not undermine the efficacy of the tool 20.

When attempting to automatically remediate hard-coded dependencies, the tool 20 needs to be correct. Whenever there is sufficient information, the tool 20 alters or externalizes the dependency without impacting the semantics of the program. In cases where information is not sufficient, the tool 20 detects that it cannot perform in the automatic remediation, and should flag that instance and provide guidance to the migration engineer that will have to perform the relinking manually.

STATIC DEPENDENCY DISCOVERY AND RELINKING: Static dependency discovery and relinking will now be described. One method implemented by the tool 20 is briefly described and followed by a more detailed description of each step.

Referring to FIG. 3, tool 20 performs the following. In block 302, the tool 20 gathers code and configuration information. In one embodiment, Galapagos™ is employed to detect deployed applications. For each application, the application code, configuration information and state data are collected. In block 304, a call graph is constructed. For each application archive gathered by Galapagos™, the possible entrypoints are determined and a call graph rooted at those entrypoints is constructed. In block 306, stop methods are identified. Iterate through the call graph, and detect any method invocations that access external resources. These method invocations are termed stop methods.

In block 308, invocation parameters are traced back. For each stop method invocation, determine the provenance of the relevant parameters using a modified string analysis. Classify the parameter values as derived from hard-coded constants, externalized values, or unknown. In block 310, resolve configuration access. If the previous step identified any externalized parameter values, detect which configuration files were accessed. This is done using a similar analysis to the previous step, except that a configuration access is treated as a stop method. Once the paths have been discovered, locate the accessed configuration resources in the runtime environment and resolve each externalized property.

In block 312, explore the results. This may include reporting the results to the user. The user can browse through the stop method invocations, sorted by invocation location or target. For each invocation's parameter, the user can see what possible values the parameter can take, and where those values come from. If some or all of a value is externalized, the relevant resource file and location is reported. In block 314, hard-coded dependencies are corrected or updated. For any hard-coded parameter values, we provide two illustrative options to the user. We can either modify the class file to change the constant value (see e.g., block 105), or automatically externalize the constant to a configuration file (see e.g., block 106). Each step is now described in more detail.

Gather Code and Configuration Information in block 302. We mainly consider running production environments where very little is known in advance. Therefore, before analyzing an application, we first detect it and fetch its code and related state and configuration information. There are a number of ways to detect applications, including examining the currently running processes, the registered packages, and the standard installation paths. Disk scanning is also a possibility, if audit and performance constraints on the servers permit such scanning. One can also look for processes that start others. For example, inetd can start a program upon receiving a network request. As none of these techniques are perfect in isolation, a combined approach is warranted. We have augmented the Galapagos™ tool by a number of such features since its earlier publications.

With regards to determining configuration information, Java EE™ applications usually store the configuration files inside their Enterprise Archive (EAR) files, or somewhere on the classpath. By fetching the EAR files and files from the classpath, our Galapagos™ extensions obtain most of the related configuration files. In addition to code and configuration files, we also record some system parameters defining the application's environment: its root directory, environment variables, and command-line arguments. We also fetch the configuration of the underlying application servers where our Java™ code runs.

Construct Call Graph in block 304. Once we have gathered the application code, the next step is to load the program into WALA, the analysis framework we use. This is done simply by pointing WALA to the application archive files. We modified WALA to support the multilevel nested archive files common in Java EE applications. We then generate call graphs for each module, which are used in the subsequent analyses. These call graphs are constructed using WALA's standard propagation call graph builder, and are rooted at specific entrypoints. Proper entrypoint determination has importance, as any missed entrypoints can result in large sections of the program being considered dead and being ignored for the remainder of the analysis. For standard Java™ applications, we include any main methods and static initializers. We also include Java™ Servlet methods entrypoints and entrypoints derived from the Java EE™ deployment descriptor. An entrypoint-less call graph construction may be employed using the type hierarchy rather than an iterative data-flow solver. By eliminating the need to identify entrypoints, we can ensure that no live code is considered dead.

Identify Stop Methods in block 306. A stop method is any method that provides access to an external resource. This access can be accomplished directly through native code, as is the case with many methods in FileInputStream, or indirectly through other Java™ methods, as is the case with FileReader. Given this definition, it should be noted that any method from which a resource is transitively accessed could be considered a stop method.

As a first pass, we could limit stop methods to those that directly access external resources through native code. This would likely be effective, as in theory any method indirectly accessing external resources can be analyzed to trace through to the invocation of a direct method. However, this increases the amount of analysis needed, introduces more room for error (given that no analysis of this type is 100% successful), and is rather confusing for users (as people are not generally familiar with the private native methods that actually implement the access functionality). In light of these difficulties, we define a stop method as any direct or indirect method that makes up the public application programmer interface (API) for the external resource accessing functionality. For a direct native method to be invoked, a method public API is used, so every access will be captured. For example, FileInputStream's private native method open is only invoked in the constructors of the class. So by marking the constructors as stop methods, we guarantee that we catch any access to open.

An additional constraint is that we only consider methods that name the resource being accessed. For example, the constructors of FileInputStream take the path to the file as input, and so are useful stop methods. The read method, on the other hand, is not useful, as it does not provide any information about the resource. If there is not any method that names the resource being accessed, then its location is likely specified in the configuration files that are analyzed by other approaches. We annotate each stop method with its parameters that describe the location of the resource that the stop method accesses. In most cases, this location is expressed as a String. When this is not the case, such as the FileInputStream constructor that has a File as the input parameter, we do not include that method as a stop method and instead use the method that creates the parameter type (in this case, the constructors to File).

In some cases, the method that specifies the location never accesses a native method. An example of this is java.io.File. The constructor does not directly or indirectly access the file system (it only sets a number of fields), yet we consider it to be a stop method. Conversely, the length method does access the file system (by delegating to a native method in java.io.FileSystem), but we do not consider it a stop method.

For purposes of explanation, we illustratively describe the identification of stop methods for the Java Standard Library and some Java EE APIs. A list of stop methods includes many methods in the java.io and java.net packages, as well as methods relating to loading resources and creating database connections. The tool 20 can easily be adapted to use any method as a stop method, and so can be extended to cover custom libraries or other types of frameworks. Actually identifying the invocations of stop methods is straightforward. We iterate through all the edges in the call graph, and check for cases where the destination method signature matches a stop method.

Trace back invocation parameters in block 308. Once the stop method invocations have been identified, we analyze each invocation to determine the provenance of the location-describing parameters. A parameter's value can be derived from a hard-coded constant (see Table 1), from an external resource (Table 2), or from a combination of both. This determination is performed by, e.g., a WALA-based string analysis package that we altered to our needs.

The string analysis works as follows. Given a WALA call graph and a single parameter, it computes a context-free grammar (CFG) approximating the parameter's value. This approximation is conservative, in that it is a superset of all values that the parameter might take. In many cases, the CFG returned by the string analysis will resolve to a single string or a set of strings. This indicates that the external resource location was hard-coded into the application. Recall, for example, that the analysis computes the two possible paths for f1 from Table 1 as /data/matrix.old and /data/matrix). This case is ideal, as we know the location of the resource being accessed, as well as where in the program that location is specified. In the remainder of cases, however, the CFG will simply resolve to a wildcard, indicating that the analysis was unable determine any specific values for the parameter.

As was described earlier, in many situations the location of the resource is contained in a properties file or some other external configuration file. In the standard string analysis, such cases result in a wildcard, as the analysis does not know how to handle the methods accessing these configuration files. We extended the string analysis by adding transducers for those methods. Transducers are used when the string analysis attempts to solve the grammar (initially derived from the single static assignment form of the bytecode) for the parameter in question. Whenever the value of the parameter depends upon the result of an external method invocation, the string analysis looks for a transducer for that method. The transducer then rewrites the grammar to remove the invocation while mimicking the behavior of that method.

For example, the append method for StringBuffer has a transducer that adds a production rule to the grammar where the output value is the concatenation of its current value and the parameter's value. If a transducer is not found, the default transducer is used that replaces the invocation with a wildcard value. In our case, to implement handling for configuration access, we add transducers for methods like the getProperty in java.util.Properties. These transducers record that an access has occurred, and replace each invocation with a unique key string. In the example from Table 3, the original string analysis would result in jdbc:db2://*. With the custom transducer added, the result is instead jdbc:db2://$$_____1_____$$, with $$_____1_____$$ being the unique key string inserted by the transducer. Once the configuration accesses have been resolved (in block 310), these key strings can be replaced with the value of the access, and annotated with the location the value came from. For this example, we would know that $$_____1_____$$ has the value sales and came from a resource named "settings.properties".

Resolve configuration access in block 310. The next step in the analysis is to resolve those cases where a parameter's value is dependent on an external properties or configuration file. We begin with the list of configuration accesses from the previous step. Continuing with the example in Table 3, the only configuration access is the expression props.getProperty ("db.dbname"). For each access, we attempt to determine the location of the resource ("settings.properties") and the part of the resource that was accessed ("db.dbname").

A variant of the string analysis performed in block 308 is used to accomplish this. To determine the part of the resource being accessed, we trace back the parameter value in the identical manner as described above. For the example, this means identifying the hard-coded string constant "db.dbname". To determine the location of the configuration file, we then apply the analysis to the access' receiver object. For example, if the access was an invocation of getProperty on a Properties object, we trace back the value Properties object. In this case, it means determining that the props local variable was loaded from "settings.properties". While the object is not itself a string, we consider the object to have the string value of the location the object was loaded from.

We retain the special transducers for capturing configuration access, in case the configuration file's location was itself stored in a configuration file. To those transducers, we add ones for the methods that populate the configuration objects, thereby linking the Properties object to the object it was loaded from. In our example, this allows us to connect props with the getResourceAsStream invocation through the load method. We add transducers for each stop method. These stop method transducers simply pass along their location parameters, which permits us to trace back through input streams and loaded files.

Once the configuration file location and property name are both known, we then load the file ourselves to extract the possible values for the property. In situations where the file location is fully specified, this step is straightforward. If only a relative path is given, we use the information collected by Galapagos™ about the system's runtime configuration to reconstruct the full path. For cases where Java™'s Class Loader is used to load the resource, we mimic its behavior to find the resource on the classpath.

It should be noted that this analysis of configuration access is only possible when the program uses a known approach, as the analysis needs transducers to model the behavior of the relevant methods. For tool 20, we modeled both Properties and ResourceBundles, as those are the two main ways the Java™ Standard Library provides for handling loading configurations. In cases where the program uses some other approach, the link between the location of an external resource access and the configuration file that location came from needs to be found by other means. Our identification of stop methods in block 306 will still detect the loading of the configuration file.

Explore results in block 312. The result may be presented to a user. The user can browse through the stop method invocations, sorted by invocation location or target. For each invocation's parameter, the user can see what possible values the parameter can take, and where those values come from. If some or all of a value are externalized, the relevant resource file and location is reported.

Correct hard-coded dependencies in block 314. Once the analysis has been completed and the results examined, the user is presented with the option to automatically correct any hard-coded dependencies. The correction may include making the hard-coded dependencies compliant with a given specification as set forth with reference to FIG. 2. The user provides a list of mappings from old to new addresses for any resources that are being relocated, which is then compared with the discovered resources to generate an automated relinking plan. Going back to the example in Table 1, if the user wanted to map "/data/matrix.old" to "/share/data/matrix.old" then the tool 20 would generate a suggested plan to change the constant "/data/" to "/share/data/". The tool 20 would also warn the user that making this change would result in "/data/matrix" now mapping to "/share/data/matrix".

To generate these plans, we use a feature of the string analysis package that records what program statements were the source of each piece of the string. We begin by breaking the old address into chunks based on the statement that generated each chunk in the code. In the example of Table 1, this results in "/data/matrix.old" being broken into "/data/" and "matrix.old".

Once the mapping plan has been generated, we may provide two options to the user. Most simply, we can modify the class files to replace one constant value with another. This allows for relinking with minimal changes to the original application.

As a second option, we can automatically externalize the constant to a resource file. To do this, we begin by synthesizing a class containing a static final field for each constant to be externalized. We then create a static initializer for this class that loads a properties file and initializes each field to the value specified in the properties file. This properties file is generated with the constant values from the original program, and placed such that the ClassLoader can locate it. In the initial class files, we replace every constant load instruction for one of those constants with a field load instruction, pointed at the corresponding field. It should be understood that other modification and updates may be provided to make the hard-coded dependencies compliant for a given specification (e.g., target location specification) or to make the hard-coded dependencies configurable to permit an easy and universal change to files/programs or classes of files/programs.

This modification imposes a slight performance penalty on each access, and a large penalty when the constants are first loaded. In our testing, we have found that even for string-intensive long-running applications this impact is negligible. In cases where the source code is available, we can instead automatically generate patches for the source code that implement the same behavior as the bytecode modifications.

Performance: Table 4 shows the performance of one embodiment of the hard-coded dependency extractor in accordance with the present principles for several applications of different sizes. In this experiment, we ran the extractor for a single stop function that is invoked only once in the code. We conducted this experiment on a 2 GHz Linux machine with 4 GB of memory. For each application, we list in Table 4, the number of classes in the program, the number of call graph nodes, the number of production rules instantiated by the string analysis to evaluate the values of the string variables in the program, and the time required to perform the analysis. The applications are sorted by the number of classes in them, as this is a good approximation of program complexity. About two thirds of the execution time is spent on building the call graph and doing other one-time per application operations.

The string analysis includes the emulation of string flows through an application. In case of a large enterprise application, this process becomes complex, which may lead to relatively long execution times (e.g., the total per-application processing takes 10-100 times longer than one stop function times listed in Table 4). Fortunately, this analysis can be performed off-line after we have fetched the application code and related configuration files. Therefore, the amount of time needed to perform the analysis is tolerable. In addition, the off-line nature of analysis allows us to use powerful servers. In particular, for our large-scale experiments with all the applications, we used a set of IBM System p5 575 16 core systems that are a lot more powerful than the server used for Table 4.

TABLE 4

PERFORMANCE ON APPLICATIONS OF VARIOUS SIZES

| Application | Classes | Nodes | Rules | Time (sec) |
| --- | --- | --- | --- | --- |
| App1 | 71 | 822 | 11130 | 33 |
| App2 | 835 | 7828 | 545792 | 150 |
| App3 | 1585 | 11648 | 406645 | 173 |
| App4 | 3141 | 20510 | 674450 | 319 |

We have presented a static discovery method for analyzing code dependencies on external resources such as databases, messaging queues, files, and whatever is not part of the program code. The method is complete under reasonable assumptions and verifiable conditions, on the code. We have implemented one embodiment for Java EE™ applications in IBM WebSphere and Oracle WebLogic application servers and analyzed three enterprise application environments, comprising 1097 unique applications. The resulting statistics show that such code analysis is indeed needed, although the Java EE™ standards recommend that dependencies should be defined in special resource files and not in the code. The percentage of hard-coded dependencies in the three environments, even if one only counts databases and messaging queues, range from 31 to 94%, i.e., for this percentage of applications all prior static discovery tools, including our own Galapagos' tool, miss dependencies. Hence, every transformation project or problem resolution on such environments need to take hard-coded dependencies into account. We also showed that less than 10% of hard-coded dependencies are given as string constants, justifying static string analysis. Components of these strings often come from other resources in the environment of the program. The present framework comprises configuration analysis, which was implemented with the string analysis. Configuration analysis may be relevant also outside dependency analysis, e.g., when string analysis is used for security purposes.

Figure 5:
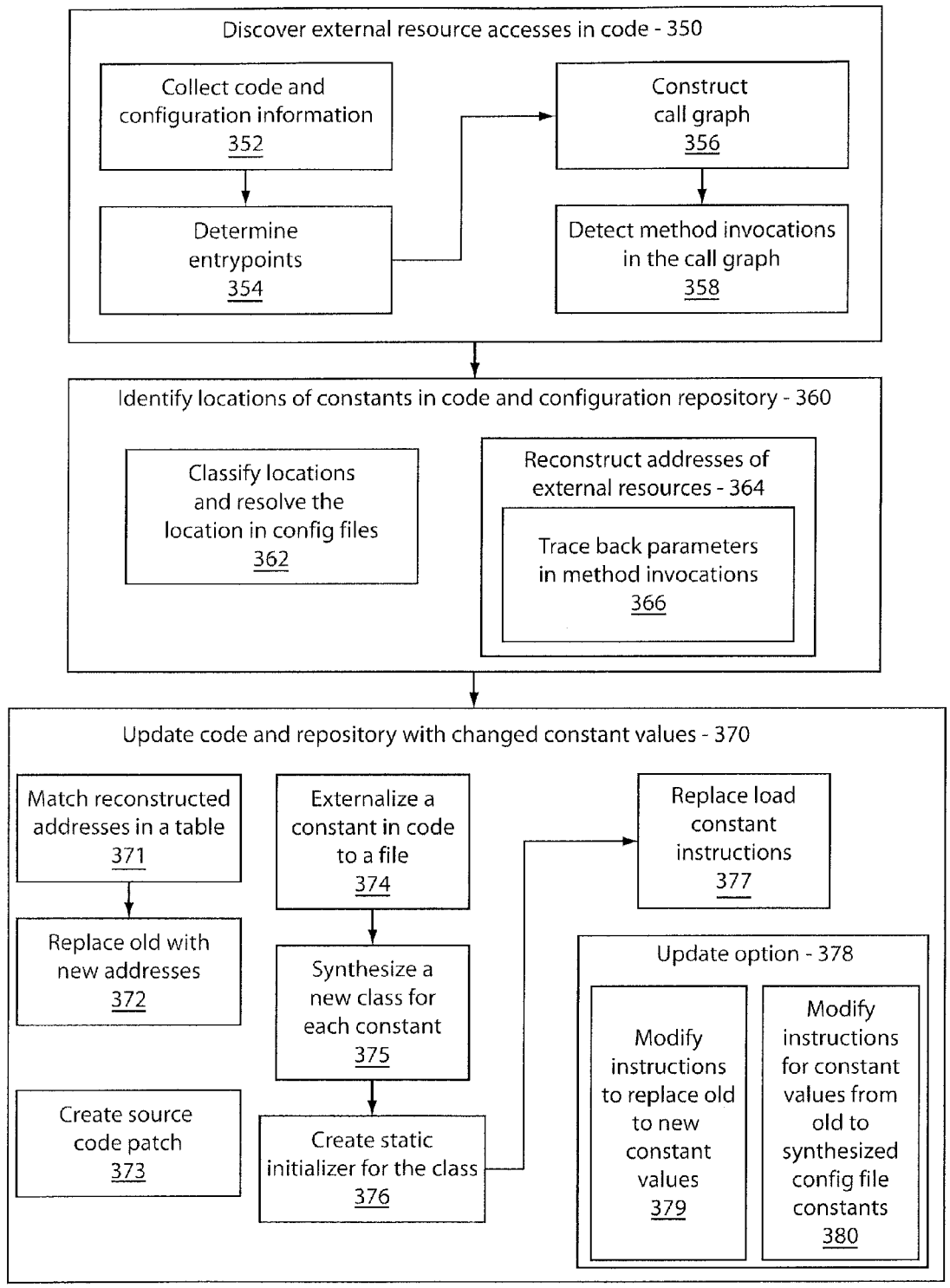
FIG. 5 is a block/flow diagram showing a system/method for discovering and updating hardcode dependencies in accordance with one illustrative embodiment.

Referring to FIG. 5, a system/method is illustratively shown for a particularly useful embodiment. In block 350, one or more instances of external resource access are discovered by statically analyzing application code. The discovery process may include collecting code and configuration information for a deployed application in block 352, determining entrypoints in the deployed application in block 354, constructing a call graph rooted at the entrypoints in block 356 and detecting method invocations in the call graph that access external resources in block 358.

In block 360, one or more locations of constants are identified in the application code and a configuration repository that specify addresses of discovered instances of external resource access. This may include identifying one or more locations of constants using string analysis. Location of constants may be identified by classifying locations of constants as positioned in the application code or in the configuration repository and, for the locations in the configuration repository, resolving the location within the configuration files in block 362. The identification process may include reconstructing addresses of accessed external resources in block 364. The reconstructing may include reconstructing the addresses of the external resources by tracing back parameters of detected method invocations using string analysis in block 366.

In block 370, the application code and the configuration repository are updated to change values of the constants to enable migration. The updating may include matching reconstructed addresses of the external resources with a table mapping old addresses to new addresses in block 371 and updating the application code and the configuration repository to change values of the constants such that old addresses are replaced by new addresses in block 372. The updating may also include creating a source code patch or a patch sketch to update an original source in block 373.

In one embodiment, the updating includes automatically externalizing a constant in the application code to a file in the configuration repository in block 374, synthesizing a new class including a static final field for each constant to be externalized in block 375, creating a static initializer for the class that loads the configuration file and initializes each static final field to a value specified in the configuration file in block 376 and replacing all associated load constant instructions with a corresponding field access instruction in block 377.

In block 378, an option may be provided to update the constants in the application code by performing at least one of: modifying instructions in the application code to replace an old constant value with a new value in block 379; and modifying instructions in the application code to replace the old constant value with a value loaded from synthesized configuration files in the configuration repository in block 380.

Figure 4:
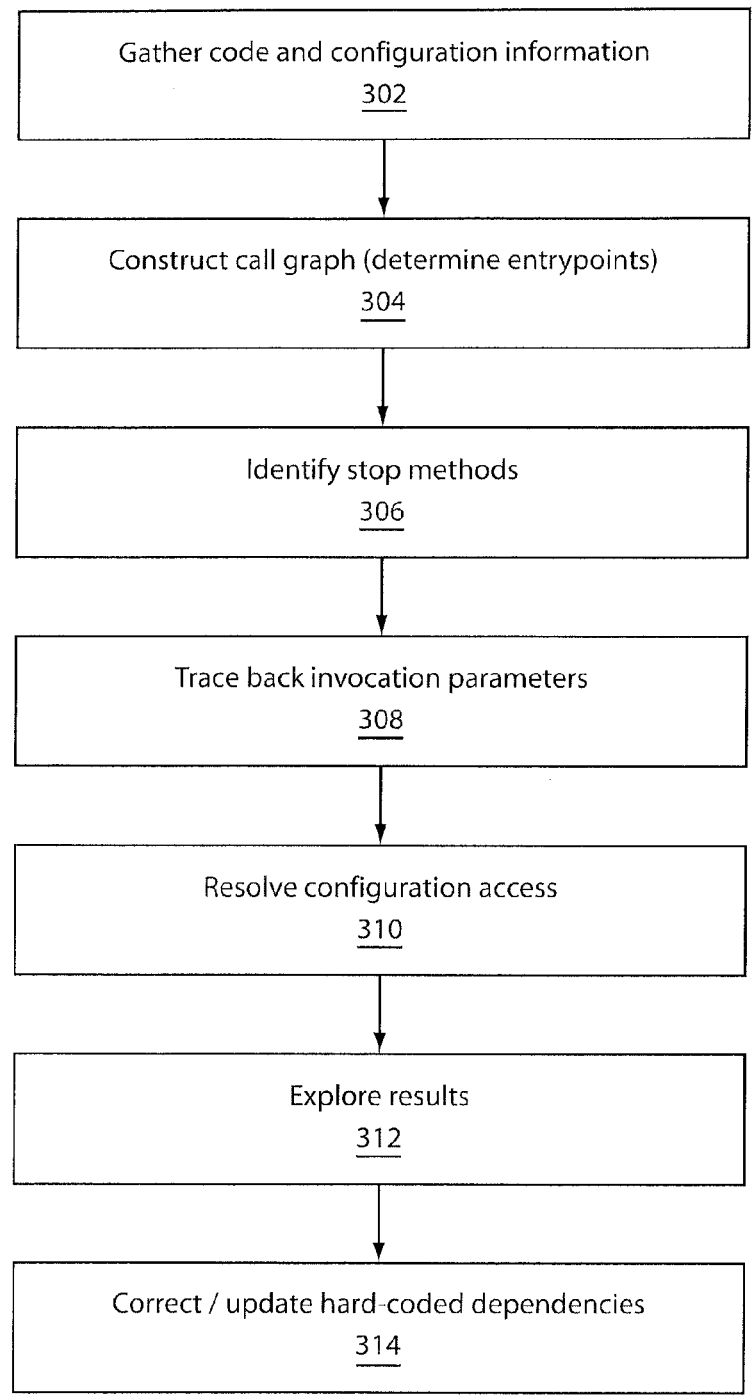
FIG. 4 is a block/flow diagram showing a system/method for static dependency discovery, relinking and bringing dependencies in compliance with a specification in accordance with the present principles.
Figure 6:
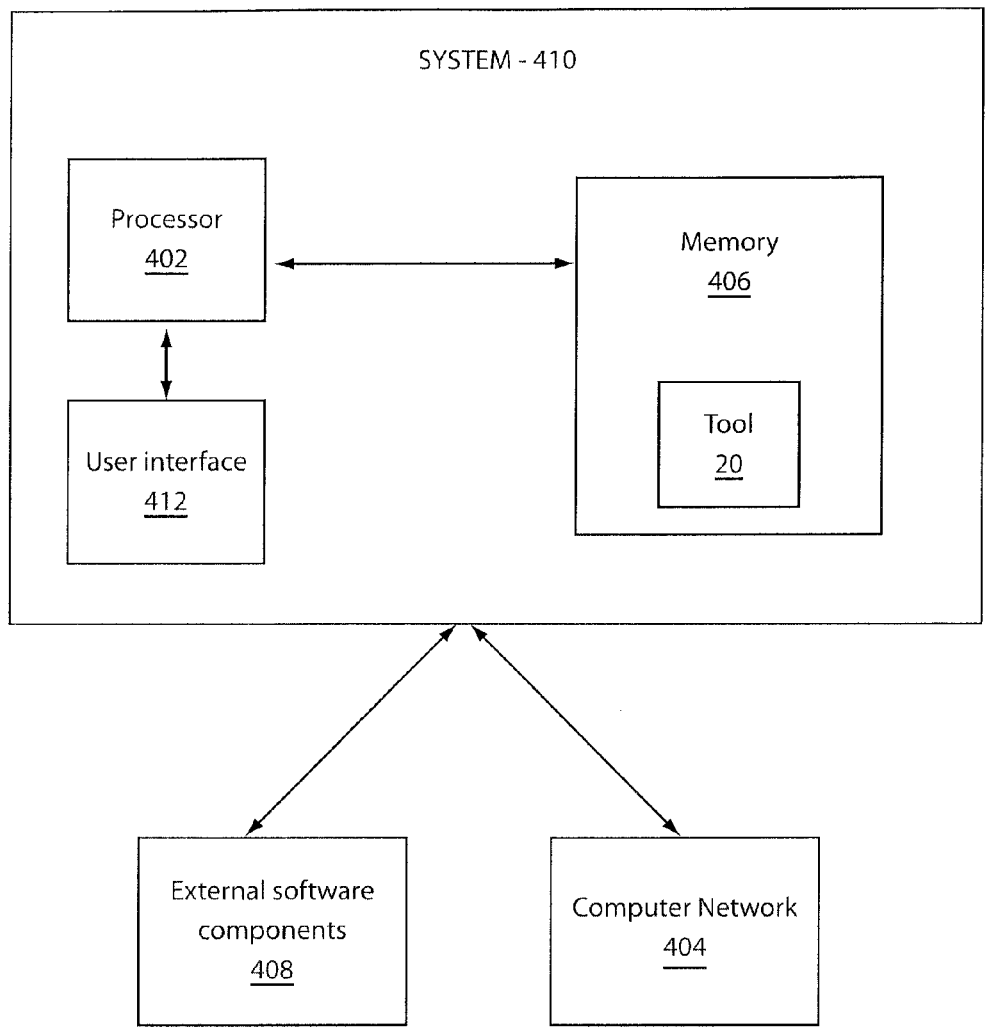
FIG. 6 is a block diagram showing an illustrative system for static dependency discovery, relinking and bringing dependencies in compliance with a specification in accordance with the present principles.

Referring to FIG. 6, a system 410 for analyzing and updating resources for transformation or migrations. System 410 includes one or more processors 402 coupled to a memory device or devices 406. The tool 20 for analyzing and updating hard-coded dependencies is stored in memory and is executed using the processor 402. Tool 20 is configured to perform the methods as described with respect to FIGS. 2, 4 and 5. System 410 includes a user interface 412 which permits interactions with the system 410 to effectuate discovery and update of dependencies for migration and other events. The system 410 can analyze code and access external sources (e.g., a computer network 404 or other external software components 408) in preparing for a migration or transformation and provide options to a user during the process.

Having described preferred embodiments of a system and method for updating hard-coded dependencies (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method, comprising:
discovering, by a processor, one or more instances of external resource access by statically analyzing application code;
specifying, by the processor, addresses of the discovered instances of external resource access;
identifying, by the processor, one or more addresses of one or more constants in the application code and a configuration repository of the specified addresses of discovered instances of external resource access, the one or more constants being stored in a non-transitory computer readable storage medium;
updating, by the processor, one or more values of the one or more constants in the application code and the configuration repository;
wherein the application code is updated by replacing at least one of the one or more values of the one or more constants with one or more updated values of the one or more constants; and
wherein the updating includes matching one or more addresses of the external resources with a table mapping the one or more addresses of the one or more constants to one or more updated constant addresses; and
using, by the processor, the one or more updated values of the one or more constants in the application code and the configuration repository in current or future migrations.

2. The method as recited in claim 1, wherein the discovering one or more instances of external resource access includes:
collecting code and configuration information for a deployed application;
determining entry points in the deployed application;
constructing a call graph rooted at the entry points; and
detecting method invocations in the call graph that access external resources.

3. The method as recited in claim 1, wherein identifying includes identifying one or more locations of constants using string analysis.

4. The method as recited in claim 1, wherein identifying includes:
classifying locations of constants as positioned in the application code or in the configuration repository; and
for the locations in the configuration repository, resolving the location within configuration files.

5. The method as recited in claim 1, wherein identifying includes reconstructing addresses of accessed external resources.

6. The method as recited in claim 5, wherein reconstructing includes reconstructing the addresses of the external resources by tracing back parameters of detected method invocations using string analysis.

7. The method as recited in claim 5, wherein updating further includes:
matching reconstructed addresses of the external resources with a table mapping old addresses to new addresses; and
updating the application code and the configuration repository to change values of the one or more constants such that old addresses are replaced by new addresses.

8. The method as recited in claim 1, wherein updating includes creating a source code patch or a patch sketch to update an original source.

9. The method as recited in claim 1, wherein updating further includes:
automatically externalizing a constant in the application code to a file in the configuration repository;
synthesizing a new class including a static final field for each constant to be externalized;
creating a static initializer for the class that loads the configuration file and initializes each static final field to a value specified in the configuration file; and
replacing all associated load constant instructions with a corresponding field access instruction.

10. The method as recited in claim 1, wherein updating further includes:
providing an option to update the one or more constants in the application code by performing at least one of:
modifying instructions in the application code to replace an old constant value with a new value; and
modifying instructions in the application code to replace the old constant value with a value loaded from synthesized configuration files in the configuration repository.

11. A non-transitory computer readable storage medium comprising a computer readable program, wherein the computer readable program when executed on a computer causes the computer to perform the steps of:
discovering one or more instances of external resource access by statically analyzing application code;

specifying addresses of the discovered instances of external resource access;
identifying one or more addresses of one or more constants in the application code and a configuration repository of the specified addresses of discovered instances of external resource access;
updating one or more values of the one or more constants in the application code and the configuration repository;
   wherein the application code is updated by replacing at least one of the one or more values of the one or more constants with one or more updated values of the one or more constants; and
   wherein the updating includes matching one or more addresses of the external resources with a table mapping the one or more addresses of the one or more constants to one or more updated constant addresses; and
using the one or more updated values of the one or more constants in the application code and the configuration repository in current or future migrations.

12. The computer readable storage medium as recited in claim 11, wherein the discovering one or more instances of external resource access includes the steps of:
   collecting code and configuration information for a deployed application;
   determining entry points in the deployed application;
   constructing a call graph rooted at the entry points; and
   detecting method invocations in the call graph that access external resources.

13. The computer readable storage medium as recited in claim 11, wherein identifying includes identifying one or more locations of constants using string analysis.

14. The computer readable storage medium as recited in claim 11, wherein identifying includes the steps of:
   classifying the addresses of the one or more constants as positioned in the application code or in the configuration repository; and
   resolving the location within configuration file for the locations in the configuration repository.

15. The computer readable storage medium as recited in claim 11, wherein identifying includes reconstructing addresses of accessed external resources.

16. The computer readable storage medium as recited in claim 15, wherein reconstructing includes reconstructing the addresses of the external resources by tracing back parameters of detected method invocations using string analysis.

17. The computer readable storage medium as recited in claim 15, wherein updating further includes the steps of:
   matching reconstructed addresses of the external resources with a table mapping old addresses to new addresses; and
   updating the application code and the configuration repository to change values of the one or more constants such that old addresses are replaced by new addresses.

18. The computer readable storage medium as recited in claim 11, wherein updating includes creating a source code patch or a patch sketch to update an original source.

19. The computer readable storage medium as recited in claim 11, wherein updating further includes the steps of:
   automatically externalizing a constant in the application code to a file in the configuration repository;
   synthesizing a new class including a static final field for each constant to be externalized;
   creating a static initializer for the class that loads the configuration file and initializes each static final field to a value specified in the configuration file; and
   replacing all associated load constant instructions with a corresponding field access instruction.

20. The computer readable storage medium as recited in claim 11, wherein updating further includes the steps of:
   providing an option to update the one or more constants in the application code by performing at least one of:
      modifying instructions in the application code to replace an old constant value with a new value; and
      modifying instructions in the application code to replace the old constant value with a value loaded from synthesized configuration files in the configuration repository.

21. A system, comprising:
a processor;
a non-transitory computer readable medium comprising a computer readable program that executes a tool, wherein the computer readable program when executed by the processor causes the tool to perform the steps of:
   discovering one or more instances of external resource access by statically analyzing application code;
   specifying addresses of the discovered instances of external resource access;
   identifying one or more addresse of one or more constants in the application code and a configuration repository of the specified addresses of discovered instances of external resource access;
   updating one or more values of the one or more constants in the application code and the configuration repository;
      wherein the application code is updated by replacing at least one of the one or more values of the one or more constants with one or more updated values of the one or more constants; and
      wherein the updating includes matching one or more addresses of the external resources with a table mapping the one or more addresses of the one or more constants to one or more updated constant addresses; and
   using the one or more updated values of the one or more constants in the application code and the configuration repository in current or future migrations.

22. The system as recited in claim 21, wherein the tool creates a source code patch or a patch sketch so that an original source is able to be updated.

23. The system as recited in claim 21, wherein the tool updates the application codes by:
   automatically externalizing a constant in the application code to a file in the configuration repository;
   synthesizing a new class including a static final field for each constant to be externalized;
   creating a static initializer for the class that loads the configuration file and initializes each static final field to a value specified in the configuration file; and
   replacing all associated load constant instructions with a corresponding field access instruction.

24. The system as recited in claim 21, wherein the tool provided an option to update the constants in the application code by performing at least one of:
   modifying instructions in the application code to replace an old constant value with a new value; and
   modifying instructions in the application code to replace the old constant value with a value loaded from synthesized configuration files in the configuration repository.

25. The system as recited in claim 21, wherein the tool includes a string analysis program for analyzing the application code.

* * * * *